E. E. HAUER.
ROTARY MOTOR.
APPLICATION FILED JULY 28, 1913.

1,124,734.

Patented Jan. 12, 1915.

Witnesses
Grover Ilgen
Floyd McKean.

Inventor
Elmer E. Hauer
By Percy Norton
Attorney

UNITED STATES PATENT OFFICE.

ELMER E. HAUER, OF SPRINGFIELD, OHIO, ASSIGNOR TO THE LAGONDA MANUFACTURING COMPANY, OF SPRINGFIELD, OHIO, A CORPORATION OF OHIO.

ROTARY MOTOR.

1,124,734.   Specification of Letters Patent.   Patented Jan. 12, 1915.

Application filed July 28, 1913. Serial No. 781,604.

*To all whom it may concern:*

Be it known that I, ELMER E. HAUER, a citizen of the United States, residing at Springfield, in the county of Clark and State of Ohio, have invented certain new and useful Improvements in Rotary Motors, of which the following is a specification, reference being had therein to the accompanying drawings.

My invention relates to rotary motors and more particularly to a motor for driving boiler tube cleaners that is adapted to travel through the tube with the cleaner, although it may be used for other purposes. Motors of this class necessarily must be of limited dimensions and operate at a high speed.

The object of my invention is to provide an improved motor of maximum efficiency and durability and to that end I have devised a novel form of casing with improved bearings arranged to carry and take the end thrust of the motor shaft. The casing is formed in a single piece giving a rigid construction to withstand the shocks and jars incident to its use in driving cleaners and being operated at a high speed arrangement is made for ample lubrication of the bearings.

With these and other objects in view my invention consists of the constructions and combinations hereinafter described and set forth in the claims.

Figure 1:
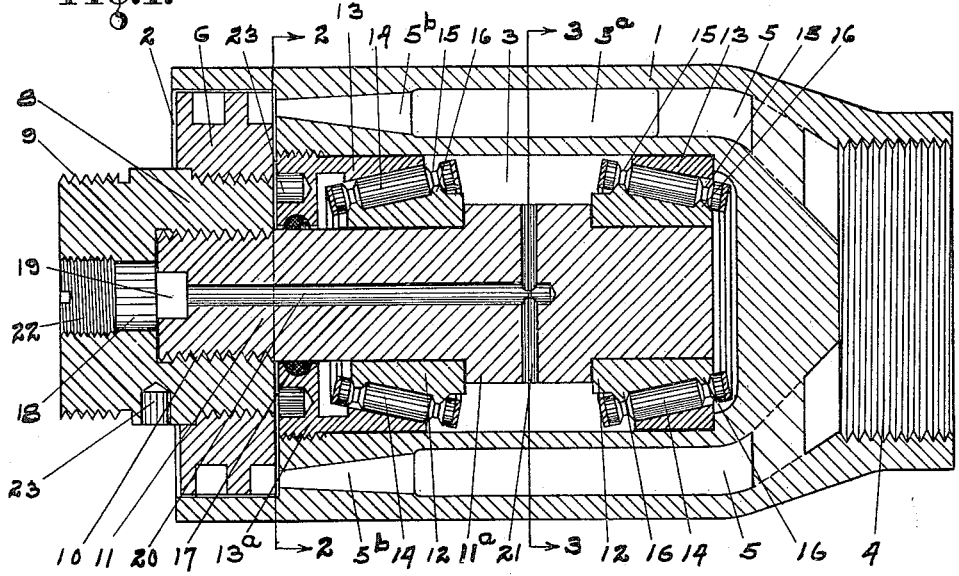
Figure 2:
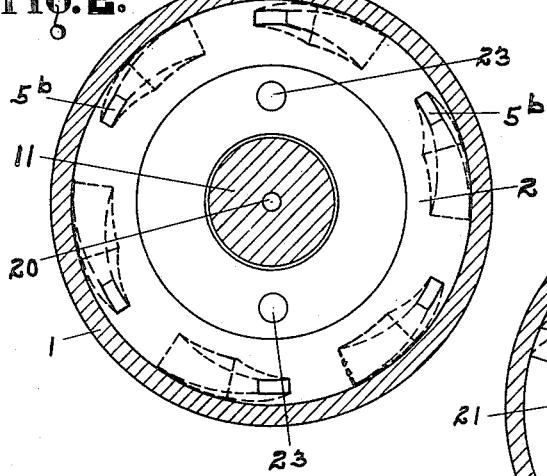
Figure 3:
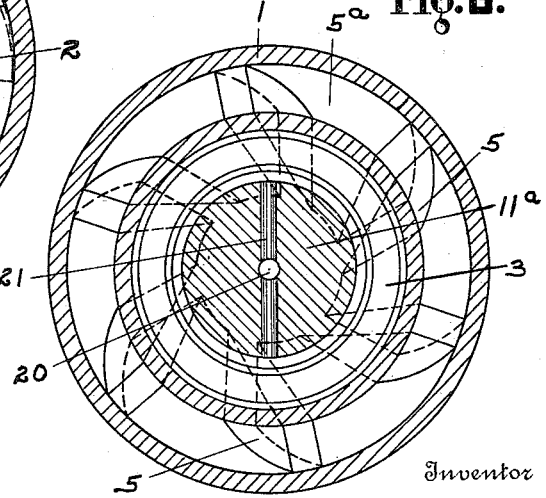

In the accompanying drawings which form a part of this specification Figure 1 is a longitudinal section of a motor embodying my invention; Fig. 2 is a cross-section on the line 2—2 of Fig. 1 and Fig. 3 is a cross-section on the line 3—3 of Fig. 1.

Like numerals represent the same parts in the several views.

In the drawings 1 represents a casing preferably formed in a single piece to give it a rigid construction and it is provided with a motor chamber 2 in its front end with a central bearing chamber 3 of less diameter than said motor chamber extending rearwardly therefrom and closed at its rear end as shown. Said casing is further provided at its rear end with a screw-threaded inlet 4 to attach a supply conduit and ports or passages 5 lead from said inlet to a chamber $5^a$ and ports or passages $5^b$ lead from said chamber to the motor chamber. Said ports or passages and chamber $5^a$ are formed within the walls of the casing and the ports or passages are preferably inclined as particularly shown by the broken lines in Figs. 2 and 3.

A rotary motor member 6 which is shown as a turbine with buckets 7 to receive the motive agent from the ports or passages $5^b$ has a hub 8 which may be formed therewith, but is shown as screw-threaded thereto, and is provided with a screw-threaded end 9 to attach the tool to be driven. It is further provided with a screw-threaded recess 10 to attach it to a shaft 11 which projects rearwardly therefrom into the bearing chamber 3 and has an enlarged portion $11^a$.

Bearings which I have shown as roller bearings are seated in the chamber 3 on opposite sides of the enlarged portion $11^a$ of the shaft and comprise portions 12 pressed upon the shaft against the ends of the enlarged portion $11^a$ of the shaft and stationary portions 13 are seated within the chamber 3. Rollers 14 arranged at an inclination to the axis of the motor between the parts 12 and 13 of the bearings are provided with grooves 15 into which projections 16 of the parts 12 extend. The part 13 of the rear bearing is seated against the rear wall of the chamber 3. The part 13 of the front bearing is extended and formed into a ring or plug $13^a$ which is screw-threaded into the walls of the chamber 3 forming a closure for said chamber. Said ring or plug is provided with a packing 17 to prevent leakage of the motive agent into the chamber 3.

An opening 18 through the rotary motor hub 8 opens into a socket 19 which in turn opens into a conduit 20 having cross-passages 21 opening into the chamber 3 for supplying a lubricant to said chamber and the opening 18 is provided with a screw-plug 22 to close the same. Recesses 23 in the ring or plug $13^a$ and the rotary motor hub 8 are provided for the engagement of a spanner wrench to screw the parts in place and a bar can be inserted in the socket 19 to hold the shaft while the rotary motor member is being screwed to the shaft.

To assemble the motor, the part 13 of the rear bearing is first seated in the chamber 3; the parts 12 are pressed upon the shaft 11 and with the rollers 14 thereon is inserted into the chamber 3; the ring or plug $13^a$ with its packing 17 and the part 13 of the front bearing is then screwed in place; and the rotary motor member being formed with or secured to the hub 8 is screwed on the shaft.

Having thus described my invention I claim:—

1. In a rotary motor, a rotary motor member arranged to attach the tool to be driven and having a shaft with oppositely disposed roller bearings, the rollers of the respective bearings being arranged at an inclination to said shaft, substantially as described.

2. In a rotary motor, a rotary motor member having a shaft and oppositely disposed roller bearings therefor, the rollers of one bearing being inclined to take the end thrust in one direction and the rollers of the other bearing being inclined to take the end thrust in the opposite direction, substantially as described.

3. In a rotary motor, a casing having a motor chamber and a bearing chamber, a rotary motor member in said motor chamber having a shaft projecting into said bearing chamber, said shaft having an enlarged portion with bearings abutting opposite sides thereof within said bearing chamber, substantially as described.

4. In a rotary motor, a casing having a motor chamber and a bearing chamber, a rotary motor member in said motor chamber having a shaft projecting into said bearing chamber, said shaft having an enlarged portion with bearings abutting opposite sides thereof arranged to support and to take the end thrust of said shaft in both directions, substantially as described.

5. In a rotary motor, a casing having a motor chamber and a bearing chamber, a rotary motor member in said motor chamber having a shaft projecting into said bearing chamber and oppositely disposed roller bearings in said bearing chamber, the rollers of one bearing being inclined to take the end thrust in one direction and the rollers of the other bearing being inclined to take the end thrust in the opposite direction, substantially as described.

6. In a rotary motor, a casing or body having an opening extending rearwardly from its front end forming a motor chamber and an opening of less diameter extending rearwardly from said motor chamber forming a bearing chamber closed at its rear end, said casing or body being formed integrally and having an inlet opening at its rear end with ports or passages through the walls thereof to said motor chamber, a rotary motor member in said motor chamber having a shaft journaled within said bearing chamber, a closure for the open end of said bearing chamber and means to supply a lubricant, substantially as described.

7. In a rotary motor, a casing having a motor chamber at its front end and a central bearing chamber of less diameter than said motor chamber extending rearwardly therefrom, open at its front end and closed at its rear end, a rotary motor member in said motor chamber having a forwardly extending projection adapted to attach the tool to be driven and a shaft secured thereto projecting into said bearing chamber, oppositely disposed rollers in said bearing chamber arranged to carry and take the end thrust of said shaft, said casing having an inlet at its rear end with ports or passages through the walls thereof to deliver the motive agent to said rotary motor member and a closure for the open end of said bearing chamber, substantially as described.

In testimony whereof I have hereunto affixed my signature in the presence of two witnesses.

ELMER E. HAUER.

Witnesses:
OLIVER H. HAUSE,
FLOYD McKEAN.

Copies of this patent may be obtained for five cents each, by addressing the "Commissioner of Patents, Washington, D. C."